United States Patent
Shevchenko et al.

(10) Patent No.: US 11,271,685 B2
(45) Date of Patent: Mar. 8, 2022

(54) METHOD OF HYBRID AUTOMATIC REPEAT REQUEST IMPLEMENTATION FOR DATA TRANSMISSION WITH MULTILEVEL CODING

(71) Applicant: LIMITED LIABILITY COMPANY "RADIO GIGABIT", Nizhny Novgorod (RU)

(72) Inventors: Andrey Arkad'evich Shevchenko, Nizhniy Novgorod (RU); Aleksey Ur'evich Trushanin, Nizhniy Novgorod (RU); Vyacheslav Ur'evich Shumilov, Nizhniy Novgorod (RU); Maksim Vital'evich Makhlyshev, Nizhniy Novgorod (RU); Roman Olegovich Maslennikov, Nizhniy Novgorod (RU)

(73) Assignee: LIMITED LIABILITY COMPANY "RADIO GIGABIT", Nizhny Novgorod (RU)

( * ) Notice: Subject to any disclaimer, the term of this patent is extended or adjusted under 35 U.S.C. 154(b) by 0 days.

(21) Appl. No.: 15/931,206

(22) Filed: May 13, 2020

(65) Prior Publication Data
US 2020/0274647 A1    Aug. 27, 2020

Related U.S. Application Data

(63) Continuation-in-part of application No. 16/226,690, filed on Dec. 20, 2018, now abandoned.

(30) Foreign Application Priority Data

Dec. 29, 2017    (RU) .......................... RU2017146997

(51) Int. Cl.
*H04L 1/18*    (2006.01)
*H04L 27/36*    (2006.01)
*H04L 27/38*    (2006.01)

(52) U.S. Cl.
CPC .......... *H04L 1/1819* (2013.01); *H04L 1/1845* (2013.01); *H04L 27/362* (2013.01); *H04L 27/38* (2013.01)

(58) Field of Classification Search
None
See application file for complete search history.

(56) References Cited

U.S. PATENT DOCUMENTS

| 3,962,551 | A | 6/1976 | Gay |
| 5,166,956 | A | 11/1992 | Baltus et al. |

(Continued)

FOREIGN PATENT DOCUMENTS

| EP | 3160071 A1 | 4/2017 |
| RU | 2575414 C2 | 2/2016 |
| RU | 2628169 C2 | 8/2017 |

OTHER PUBLICATIONS

Imai et al., "A new multilevel coding method using error-correcting codes", IEEE Transactions on Information Theory, 1977, vol. 23, No. 3, p.p. 371-377.

(Continued)

*Primary Examiner* — Gregory B Sefcheck
(74) *Attorney, Agent, or Firm* — BCF LLP

(57) ABSTRACT

A method of Hybrid Automatic Repeat Request implementation which efficiently combines received signals from multiple H-ARQ block transmission attempts encoded by the Multi-Level Coding approach with an uncoded subset of information bits, is presented. The method provides full error correction gains of the H-ARQ scheme and decoder computational complexity reduction due to transmission of uncoded bits that does not cause significant demodulator and signal processing complexity growths.
The advantages are achieved via calculation of likelihood ratio metrics and the combination of at least two different data block transmission attempts for both encoded and (Continued)

uncoded bits of a data block. Additionally, the calculation of likelihood ratio metrics for uncoded bits is performed in consideration of the results of the decoding of the encoded bits. Receiver decisions are then determined on values of uncoded bits based on values of the combined likelihood ratio metrics for uncoded bits.

9 Claims, 2 Drawing Sheets

(56) References Cited

U.S. PATENT DOCUMENTS

| | | | |
|---|---|---|---|
| 5,267,021 A | 11/1993 | Ramchandran et al. | |
| 5,331,320 A | 7/1994 | Cideciyan et al. | |
| 5,719,883 A | 2/1998 | Ayanoglu | |
| 7,096,400 B2 | 8/2006 | Lim et al. | |
| 7,221,711 B2 | 5/2007 | Woodworth | |
| 7,733,911 B2 * | 6/2010 | Lee | H04L 1/1812 370/473 |
| 7,954,041 B2 | 5/2011 | Hong et al. | |
| 8,171,374 B2 | 5/2012 | Miyazaki | |
| 8,352,252 B2 | 1/2013 | Zheng et al. | |
| 8,356,227 B2 * | 1/2013 | Chung | H03M 13/2906 714/749 |
| 8,386,870 B2 | 2/2013 | Graumann | |
| 8,639,998 B2 | 1/2014 | Graumann | |
| 8,719,663 B2 * | 5/2014 | Li | G06F 11/076 714/764 |
| 8,780,694 B2 | 7/2014 | Bai et al. | |
| 8,892,976 B2 | 11/2014 | Graumann | |
| 8,989,283 B1 | 3/2015 | Dabiri | |
| 9,042,472 B2 | 5/2015 | Klimer | |
| 9,225,357 B2 | 12/2015 | Myung et al. | |
| 9,236,976 B2 | 1/2016 | Shokrollahi et al. | |
| 9,240,808 B2 * | 1/2016 | Fonseka | H03M 13/256 |
| 9,252,968 B2 | 2/2016 | Lusted et al. | |
| 9,270,414 B2 | 2/2016 | Shokrollahi et al. | |
| 9,344,123 B2 | 5/2016 | Callard et al. | |
| 9,479,297 B2 | 10/2016 | Graumann | |
| 9,564,927 B2 | 2/2017 | Fonseka et al. | |
| 9,705,640 B2 | 7/2017 | Myung et al. | |
| 9,853,766 B2 | 12/2017 | Choo et al. | |
| 10,003,435 B2 | 6/2018 | Lorca | |
| 10,425,462 B2 | 9/2019 | Shelby et al. | |
| 10,541,780 B2 * | 1/2020 | Mukkavilli | H04L 1/0041 |
| 2008/0198814 A1 | 8/2008 | Wengerter et al. | |
| 2008/0209477 A1 | 8/2008 | Koppelaar et al. | |
| 2009/0031185 A1 | 1/2009 | Xhafa et al. | |
| 2009/0158109 A1 | 6/2009 | Park et al. | |
| 2010/0091909 A1 | 4/2010 | Ericson et al. | |
| 2010/0146355 A1 | 6/2010 | Jiang et al. | |
| 2013/0262961 A1 | 10/2013 | Richardson et al. | |
| 2017/0324512 A1 | 11/2017 | Xiao et al. | |

OTHER PUBLICATIONS

Wachsmann et al., "Multilevel codes: theoretical concepts and practical design rules", IEEE Transactions on Information Theory, 1999, vol. 45, No. 5, p.p. 1361-1391.
English Abstract for RU2450461 C2 (equivalent of US20090158109) retrieved on Espacenet on Dec. 13, 2018.
Decision to Grant with regard to the counterpad RU Patent Application No. 2017146997 dated Nov. 13, 2018 and its translation into English.

* cited by examiner

METHOD OF HYBRID AUTOMATIC REPEAT REQUEST IMPLEMENTATION FOR DATA TRANSMISSION WITH MULTILEVEL CODING

CROSS-REFERENCE TO RELATED APPLICATIONS

This application is a Continuation-In-Part (CIP) of U.S. patent application Ser. No. 16/226,690 filed on Dec. 20, 2018, entitled "METHOD OF HYBRID AUTOMATIC REPEAT REQUEST IMPLEMENTATION FOR DATA TRANSMISSION WITH MULTI-LEVEL CODING" (now abandoned) and claims the benefit of priority to the same, in which the contents contained therein are incorporated herein by reference.

FIELD OF THE INVENTION

The present invention is generally related to the field of electrical communication and more specifically to apparatus and methods that can reduce a Bit Error Rate (BER) of signal transmission in broadband telecommunication systems.

BACKGROUND OF THE INVENTION

Modern wireless communication systems use Forward Error Correction (FEC) to protect a transmitted signal against possible errors that may occur in a communication channel The main principle of FEC is to introduce redundancy into a transmitted information data sequence to form an encoded data sequence. The encoded sequence is modulated and transmitted through the communication channel. The received signal is demodulated and decoded at the receiver allowing to restore the information sequence with correction of all errors or a part of errors in the received encoded sequence. Computational complexity of the decoder determining the required computational resources of the receiver for its implementation is significant for proper code selection especially in communication systems with high throughput (1 Gbit/s and more). An example of widely spread high-performance codes with relatively small computational complexity is the Low-Density Parity Check (LDPC) codes. At the same time, despite using codes with low computational complexity and optimal decoder architectures, the computational complexity of the decoder grows significantly with increasing orders of digital modulation and the throughput.

A Multi-Level Coding (MLC) scheme is a special case of FEC and digital data modulation. Basic principles of MLC were disclosed in the research paper of H. Imai (Yokohama National University, Japan) and S. Hirakawa (University of Tokyo, Japan) "A new multilevel coding method using error-correcting codes", IEEE Transactions on Information Theory, v. It-23, no. 3, 1977, prototype. In this paper, the authors propose an efficient and simple FEC method for signals with multiple (more than two) states that splits multiple signal states into subsets encoded by binary signals with different levels of noise immunity, such that binary signals of different immunity levels are independently encoded by binary FEC codes. That is, for more immune bits a code with a higher code rate, i.e. a higher ratio of lengths of the information sequence and the total encoded sequence, is proposed. For less immune bits a code with a lower code rate is proposed. The authors have shown that this approach allows moving from binary to multilevel signals (with the number of states more than two) using the Ungerboek modulation and binary FEC codes without losing the overall capacity. The paper also indicates that to maintain the error correction efficiency, the received signal must be decoded using the Multi-Stage Decoding (MSD) method as shown in FIG. 1.

At the first stage, the received signal samples are demodulated by the interpreter I1, then the least protected bits are decoded by the binary decoder D1. The results of D1 are sent to the interpreter of signal samples of the second stage I2. Demodulation and decoding by I2 and D2 are performed in awareness of the output of D1, and so forth. Therefore, subsequent stages of demodulation and decoding of the more immune bits of a signal sample use a priori information about encoded bits from previous stages. Interest in multilevel coding is currently associated with the use of high-order modulations in wideband communication systems with high throughputs. A practically important application of the MLC technology consists in transmission of the more immune bits without coding and transmission of the less immune bits coded usually. This allows reducing the number of encoded and decoded bits per symbol, and therefore limiting the growth of the computational complexity of the decoder with increasing the modulation order. This application of MLC is noted, for example, in the paper of U. Wachsmann, et al., "Multilevel codes: theoretical concepts and practical design rules", IEEE Transactions on Information Theory, v. 45, no. 5, 1999.

The Automatic Repeat Request (ARQ) technology is an independent mechanism of error protection which requires presence of a feedback control channel Data transmission in this approach is performed by blocks with redundant information (e.g. the Cyclic Redundancy Check (CRC) checksum) added to each block to detect errors. According to error check results, the receiver generates and sends over the feedback channel an acknowledgment (ACK) or a request for the block retransmission (i.e., negative acknowledgement—"NACK"). Retransmissions are performed until either the block is received without errors or the maximum number of retransmissions or the maximum block waiting time is reached which is determined by system characteristics. One of the major drawbacks of the ARQ scheme is low efficiency of time resource utilization because of decoding of each transmission attempt independently of earlier attempts.

The principle of Hybrid automatic repeat request (H-ARQ) method is based on the FEC encoding of initially sent data with a relatively low redundancy (high coding rate), checking for errors at the receiver and generating ACK or NACK messages similarly to the ARQ scheme. In the case of unsuccessful decoding of the original data block, the original block information and the received retransmission information are combined to effectively increase the redundancy (reduce the coding rate). The most computationally simple way of information combining applicable to systems with coding all transmitted bits is mathematical addition of the Logarithmic Likelihood Ratio metrics (LLR). These metrics are calculated by the demodulator and used for data decoding. In the H-ARQ scheme if an error is detected after verifying the checksum of the decoded block, the calculated LLR values are stored at the receiver and added to the LLR values calculated for the retransmitted data block. The combined LLR metric after each retransmission is used for a new decoding attempt.

To combine gains of the H-ARQ scheme in error protection and reduce the computational complexity for high-order modulations, it is practical to apply the schemes of H-ARQ and MLC without encoding a part of the information bits together. In such a case, the LLR calculation is necessary only for the encoded subset of bits of the block for further usage by the decoder. For the uncoded subset of bits, the receiver determines the transmitted values of bits by a threshold decision depending on the value of a received signal sample, where the threshold is defined by the decoded bit values from the encoded subset. Considering the described features of the multilevel coding scheme without coding of a part of information bits the LLR summation of several block transmission attempts for H-ARQ is possible only for the encoded subset of the code word bits. In that case, the values of uncoded bits can be determined by a threshold decision using only a single block transmission attempt. The described implementation significantly reduces the overall efficiency of H-ARQ due to limiting the total probability of bit errors in a block by a probability of a bit error in uncoded bits of a single transmission attempt. A solution to this problem may be achieved by increasing the number of encoded bits in signal samples, which in turn leads to increasing the decoder computational complexity and reducing the MLC efficiency.

An alternative way of combining the received information of multiple transmission attempts in the H-ARQ scheme may be realized by performing a preliminary averaging of received symbols between attempts with weights depending on the signal-to-noise ratios (SNR) for different transmission attempts. In systems with encoding of all bits, this method is mathematically equivalent to LLR summation. However, this method is not used in practice because of a need for additional calculation of the averaging weights depending on SNR values after receiving each next transmission attempt and calculating the averaged symbols for each transmission attempt. Such a need additionally increases the computational complexity of receiver signal processing.

In MLC systems with uncoded transmissions of a part of the information bits, this approach however can be used to fully keep the H-ARQ efficiency. But, on the other hand, the need for additional calculations at the symbol level increases the computational complexity of the receiver. An additional increase of computational complexity at the symbol level in the demodulator and signal preprocessing schemes eliminates the decoder computational complexity reduction due to the MLC with uncoded part of information bits. In some cases, this leads to inexpediency of joint implementation of the H-ARQ and MLC and to impossibility of getting H-ARQ gains in cases where MLC application is required due to receiver computational resource limitation.

With this said, US Pub. Appln. No. 20100091909 by Ericson et al. ("Ericson application") proposes a method for unequal error protection and soft decision calculations that could be considered as an alternative to MLC technology. The Ericson application discloses that the n+m coded bit estimates and QMs from a log-likelihood ratio (LLR) demodulator 210 are first divided into at least two streams of bits, namely, m low-priority bit stream and n-high priority bit stream, in which the n high-priority bit stream is subjected to FEC decoder 212 processing while the m low-priority bit stream bypasses decoder 212. (See, FIG. 2). As such, the FEC decoder 212 produces k−m bits while the stream of m low-priority bit stream is not affected by the decoding process and the stream of k bits is generated as a combination of the two streams of k−m and m bits.

However, the proposed method of the Ericson application does not employ decoding results of the encoded, high priority portion of bits to calculate the likelihood ratio metrics of the uncoded, lower priority portion of bits. Instead, the proposed method indicates that the low priority stream of m bits completely bypass the decoding 212 process.

Another important feature of the Ericson application proposed method is that a received signal will be considered successfully transmitted if only the coded bits are decoded successfully. Uncoded bits could contain errors and be skipped on the receiver due to their low priority. The drawbacks do not allow for the use of such a method in target communication systems with high throughput instead of MLC, because all bits have to be received without errors for the successful transmission. H-ARQ combining for the proposed method will also be ineffective, as it would provide worse error protection in comparison with the MLC case due to less immunity of low-priority bits.

Thus, there is a need for a method for the efficient combining of the received signals from multiple H-ARQ block transmission attempts encoded using MLC with an uncoded subset of information bits. The method is to provide full gains of error correction of the H-ARQ scheme and decoder computational complexity reduction due to transmission of uncoded bits but is not to cause a significant demodulator and symbol-level signal processing complexity growths.

SUMMARY OF THE INVENTION

An embodiment of the present disclosure provides a method of implementing a Hybrid Automatic Retransmission Request (H-ARQ) for data transmission with Multi-Level Coding (MLC) where coded and uncoded subsets of bits are selected in accordance with different levels of noise immunity in a multi-level QAM symbol, such that the coded bits are mapped onto less immune bits of a symbol and the uncoded bits are mapped onto more immune bits of a symbol.

A technical result of the disclosed method is expressed by the decrease in computational complexity of a demodulator and received symbol processing schemes and the increase in error protection performance due to joint implementation of H-ARQ and MLC with an uncoded subset of information bits.

The noted technical result is achieved by the calculation of likelihood ratio metrics and their combining between at least two different data block transmission attempts for both the encoded and uncoded bits of a data block. Moreover, the calculation of the likelihood ratio metrics for the uncoded bits is performed considering the results of the decoding process of the encoded bits. Decisions of a receiver on values of the uncoded bits are made based on values of combined likelihood ratio metrics for the uncoded bits.

Implementation of H-ARQ in communication systems with MLC in which coded and uncoded subsets of bits are selected in accordance with different levels of noise immunity in a multi-level QAM symbol, such that the coded bits are mapped onto less immune bits of a QAM symbol and the uncoded bits are mapped onto more immune bits of a QAM symbol.

Accordingly, the proposed method includes: (a) performing the first transmission of a data block with a part of bits encoded with a FEC code and with the other part of bits uncoded; (b) receiving the first transmission of a data block, performing demodulation and decoding of the encoded part of bits of the received data block; (c) checking the received data block for errors and sending a retransmission request to the transmitter if errors are detected; (d) performing the second transmission of the same data block upon receipt of a retransmission request; and (e) receiving the second transmission of the data block, performing demodulation and decoding of the encoded part of bits of the received data block accompanied by combining the information obtained after reception of the first and the second transmissions of the data block.

The proposed method differs from other possible methods by comprising the following successive steps in reception of the first transmission of a data block: (b.1) demodulation of signal samples of the first transmission and calculation of likelihood ratio metrics for the encoded bits; (b.2) decoding of the encoded bits using the calculated metrics; (b.3) demodulation of signal samples of the first transmission and calculation of likelihood ratio metrics for the uncoded bits using the results of the decoding of the encoded bits; and (b.4) making decisions on values of the uncoded bits using the calculated likelihood ratio metrics for the uncoded bits.

Moreover the proposed method comprises performing the following successive steps in combining the information obtained after reception of the first and the second transmissions of the data block: (d.1) demodulating signal samples of the second transmission and calculating likelihood ratio metrics for the encoded bits; (d.2) combining the likelihood ratio metrics calculated for the encoded bits of the first and the second transmissions of the data block; (d.3) decoding of the encoded bits using the combined likelihood ratio metrics for the encoded bits; (d.4) demodulation of signal samples of the second transmission and calculation of likelihood ratio metrics for the uncoded bits using the results of the decoding of the encoded bits; (d.5) combination of the likelihood ratio metrics calculated for the uncoded bits of the first and the second transmissions of the data block; and (d.6) making decisions on values of the uncoded bits using the combined likelihood ratio metrics for the uncoded bits.

In one embodiment, the first and the second transmissions of a data block are two consecutive transmissions in a sequence of two or more transmissions of the same data block.

In another embodiment, likelihood ratio metrics for encoded or uncoded bits are calculated on a logarithmic scale. In more specific embodiments, a piecewise linear approximation is used to calculate likelihood ratio metrics in the logarithmic scale as a function of a received signal sample. In additional specific embodiments, the combination of likelihood ratio metrics in the logarithmic scale consists in their algebraic addition. In yet other specific embodiments, making decisions on values of uncoded bits consists in determining of a sign of a likelihood ratio metric in the logarithmic scale.

In other embodiments, encoded and uncoded bits are modulated using the Ungerboeck modulation. In further embodiments, a block code is used to encode bits and the encoded bits of a data block are divided into equal groups and each of these groups is encoded and decoded independently.

In other additional embodiments, a Low-Density Parity Check (LDPC) code is used to encode bits.

BRIEF DESCRIPTION OF THE DRAWINGS

Further features and advantages of the present invention will become apparent from the following description of the disclosed embodiments with reference to accompanying drawings.

Figure 1:
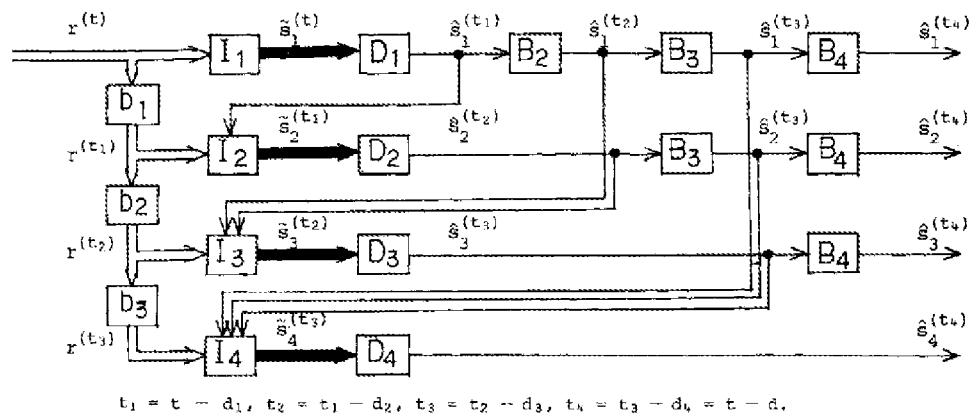
FIG. 1 (Prior Art): depicts a conventional scheme of multi-level decoding of a received signal.
Figure 2:
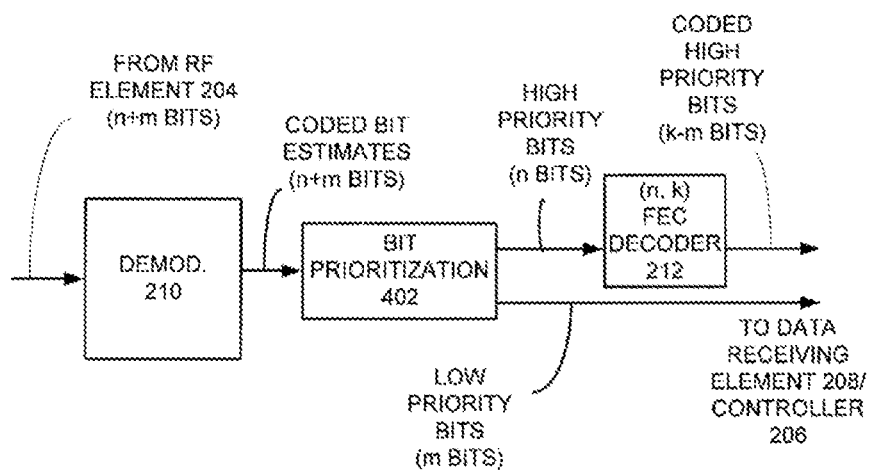
FIG. 2 (Prior Art): depicts a structure of the apparatus disclosed in US application 2010/0091909.

The following reference numerals denote various features of the figures:

101: a source of information;
102: a data block generation module;
103: a transmitter;
104: a data transmission channel;
105: a receiver;
106: a data block error checking module;
107: a feedback control channel;
108: a recipient of information;
201: a transmitted data block;
202: a module of data separation into the encoded and uncoded parts;
203: an encoder;
204: a modulator of encoded bits;
205: a modulator of uncoded bits;
206: a resulting modulated signal;
301: a received signal;
302: a demodulator of encoded bits;
303: a module for combining LLR values of encoded bits from multiple transmissions;
304: a decoder;
305: a read and write controller for the combined LLR values of encoded bits;
306: memory;
307: a demodulator of uncoded bits;
308: a module for combining LLR values of uncoded bits from multiple transmissions;
309: a threshold device;
310: a read and write controller for the combined LLR values of uncoded bits;
311: memory;
312: a data combining module; and
313: a resulting bit sequence of a data block.

DETAILED DESCRIPTION OF THE DISCLOSED EMBODIMENTS

The instant disclosure is directed to address the noted deficiencies of the current state of the art. Accordingly, a description of the embodiments of the proposed method of Hybrid Automatic Retransmission Request (H-ARQ) implementation for data transmission with Multi-Level Coding (MLC) is presented. The presented H-ARQ with MLC method is configured to allow for coded and uncoded subsets of bits to be selected in accordance with different levels of noise immunity in a multi-level QAM symbol, such that the coded bits are mapped onto less immune bits of a symbol and the uncoded bits are mapped onto more immune bits of a symbol.

The presented method includes: (a) performing the first transmission of a data block with a part of bits encoded with a forward error correction (FEC) code and with the other part of bits uncoded; (b) receiving the first transmission of a data block, performing demodulation and decoding of the encoded part of bits of the received data block; (c) checking the received data block for errors and sending a retransmission request to the transmitter if errors are detected; (d) performing the second transmission of the same data block upon receipt of a retransmission request; and (e) receiving the second transmission of the data block, performing demodulation and decoding of the encoded part of bits of the received data block accompanied by combining the information obtained after reception of the first and the second transmissions of the data block.

The transmitted data block $b=\{b_0, b_1, \ldots b_{N-1}\}$ with the size of N bits is divided into two bit sequences $b_c$ and u representing the encoded and uncoded subsets of the block bits. A size of the encoded sequence is $N_c=N_{symb} \cdot m_c \cdot R$, a size of the uncoded sequence is $N_u=N_{symb} \cdot m_u$ provided that $N=N_c+N_u$, where $N_{symb}$ is the number of signal samples (symbols), $m_c$ and $m_u$ are the numbers of encoded and uncoded bits of a single signal sample respectively, R is a code rate for the encoded bits. The bit sequence $b_c$ is converted by a FEC code with a rate of R into an encoded bit sequence $c=\{c_0, c_1, \ldots c_{Ncod-1}\}$ with the length of $N_{cod}=N_{symb} \cdot m_c$. The encoded sequence c is divided into $N_{symb}$ blocks $c(k)$, $k=0, \ldots, N_{symb}-1$, each of them has $m_c$ bits provided that each block is used to modulate a separate signal sample. The uncoded sequence u is divided into $N_{symb}$ blocks $u(k)$, $k=0, \ldots, N_{symb}-1$, each of them has $m_u$ bits provided that each block is used to modulate a separate signal sample.

The modulation of each signal sample $s(k)$, $k=0, \ldots, N_{symb}-1$ is performed as follows: a block of the encoded sequence $c(k)$ is mapped onto a intermediate signal sample $s_g(k)$ using the Gray code; a block of the uncoded sequence $u(k)$ is mapped onto an offset signal $s_u(k)$ using the Ungerboeck code; and the resulting signal sample $s(k)$ is calculated by adding the offset $s_u(k)$ to the signal sample $s_g(k)$, as represented below:

$$s(k)=s_g(k)+s_u(k).$$

After modulation of all $N_{symb}$ signal samples of the block, the signal $s=\{s(0), s(1), \ldots, s(N_{symb}-1)\}$ is transmitted through a communication channel. The transmitted signal s is the same for both the first and the second transmissions of the data block.

The demodulation and decoding of the received signal $r=\{r(0), r(1), \ldots r(N_{symb}-1)\}$ corresponding to the transmitted signal s for both the first and the second transmissions include demodulation of signal samples and calculation of likelihood ratio metrics for the encoded bits; decoding the encoded bits using the calculated metrics, demodulation of signal samples and calculation of likelihood ratio metrics for the uncoded bits using the results of the decoding of the encoded bits; and making decisions on values of the uncoded bits using the calculated likelihood ratio metrics for the uncoded bits.

As such, the demodulation of the encoded bits $c(k)$ mapped onto less immune bits of multi-level QAM symbols is independently performed for each received signal sample $r(k)$, $k=0, \ldots, N_{symb}-1$. In a representative embodiment, a likelihood ratio metric in the logarithmic scale (LLR) is calculated for each bit $c(k)_i$ from $c(k)$, $i=0, \ldots, m_c-1$, as noted below:

$$LLR(c(k)_i) = \log \frac{\sum_{\alpha \in S_i^{(1)}} p(r(k)\,|\,s(k) = \alpha)}{\sum_{\alpha \in S_i^{(0)}} p(r(k)\,|\,s(k) = \alpha)},$$

where $S_i^{(1)}$ and $S_i^{(0)}$ denote subsets of a set of all possible values of a transmitted signal sample s with the i-th encoded bit defined as $c_i=1$ and $c_i=0$ respectively, p( ) denotes a conditional (a posteriori) probability density function.

In another embodiment, a piecewise linear approximation is applied to calculate likelihood ratio metrics in the logarithmic scale as a function of a received signal sample which can be expressed as:

$$LLR(c(k)_i) = \frac{1}{2\sigma^2} \left( \min_{\alpha \in S_i^{(0)}} |r(k) - \alpha|^2 - \min_{\alpha \in S_i^{(1)}} |r(k) - \alpha|^2 \right),$$

where $\sigma^2$ additionally denotes the noise variance in a received signal sample $r(k)$.

The set of $N_{symb} \cdot m_c$ calculated metrics for all bits of the encoded sequence c is used for decoding. Decisions of the receiver on values of the bits in the $b_c$ and c sequences that are denoted by $b_c^{(est)}$ and $c^{(est)}$ respectively are expressed in the results of the decoding.

The demodulation of the uncoded bits $u(k)$ mapped onto high immune bits of multi-level QAM symbols is also independently performed for each received signal sample $r(k)$, $k=0, \ldots, N_{symb}-1$. In a representative embodiment, an LLR is calculated for each bit $u(k)_i$ from $u(k)$, $i=0, \ldots, m_u-1$, as follows:

$$LLR(u(k)_j) = \log \frac{\sum_{\alpha \in S_j^{(1)}(c(k)^{(est)})} p(r(k)\,|\,s(k) = \alpha)}{\sum_{\alpha \in S_j^{(0)}(c(k)^{(est)})} p(r(k)\,|\,s(k) = \alpha)},$$

where $S_j^{(1)}(c(k)^{(est)})$ and $S_j^{(0)}(c(k)^{(est)})$ denote subsets of a set of all possible values of a transmitted signal sample s with the j-th uncoded bit defined as $u_j=1$ and $u_j=0$ respectively and $m_c$ values of the encoded bits are equal to the values of bits in $c(k)^{(est)}$ for the current k-th signal sample.

In one embodiment, a piecewise linear approximation is applied to calculate likelihood ratio metric in the logarithmic scale as a function of a received signal sample which can be expressed as:

$$LLR(u(k)_j) = \frac{1}{2\sigma^2} \left( \min_{\alpha \in S_j^{(0)}(c(k)^{(est)})} |r(k) - \alpha|^2 - \min_{\alpha \in S_j^{(1)}(c(k)^{(est)})} |r(k) - \alpha|^2 \right).$$

In another representative embodiment, making decisions on values of the uncoded bits is achieved by determining a sign of an LLR for the uncoded bits. For the above notations the positive sign of an $LLR(u(k)_j)$ corresponds to the bit value of 1 and the negative sign corresponds to the bit value of 0.

The sequence of decisions $u^{(est)}$ for all the $N_{symb} \cdot m_u$ uncoded bits and the sequence of decisions $b_c^{(est)}$ for the encoded bits are combined into a sequence of decisions for the entire data block $b^{u(est)}$.

A combination of LLR metrics for the encoded bits $LLR(c(k)_i)$ and the uncoded bits $LLR(u(k)_j)$ calculated for the first and the second data block transmissions after the second data block transmission is performed independently for each bit via their algebraic addition. The combined metrics for the encoded bits are then used for decoding of the encoded bits and the combined metrics for the uncoded bits are then used for making decisions on values of the uncoded bits.

The first and the second transmissions of a data block in the above description are two consecutive transmissions in a sequence of two or more transmissions of the same data block.

Figure 3:
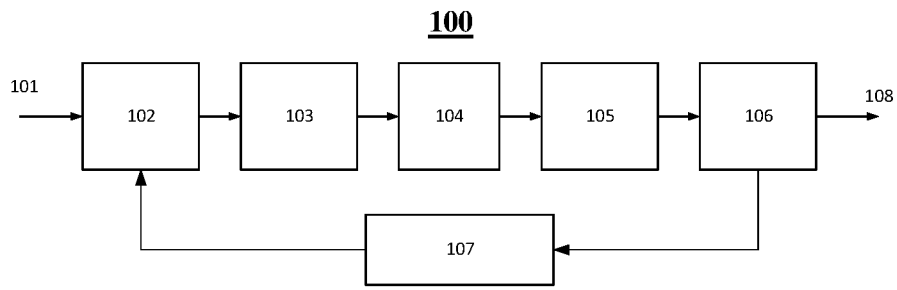
FIG. 3: depicts data transmission scheme 100 with H-ARQ, in accordance with various embodiments of the present disclosure.

A general scheme of data transmission using MLC and H-ARQ 100 is provided by FIG. 3, in accordance with the embodiments of the present disclosure. The scheme 100 provides the following operational steps: data is transmitted from a source of information 101 to a data block generation module 102 where a checksum for integrity verification is added. The generated data block is then provided to transmitter 103 to generate a signal sequence. The signal sequence is transmitted through a data transmission channel 104 to a receiver 105 performing demodulation of the sequence and data decoding.

A data block error checking module 106 then performs error checks in the data block using the checksum. If data block error checking module 106 detects no errors, the received block is transmitted to a recipient of information 108 and an acknowledgment (ACK) is sent over a feedback control channel 107. If errors are detected, a negative acknowledgment (NACK) is sent over the feedback channel 107.

Upon receiving a NACK, the transmitter 103 then retransmits the same signal sequence through the data transmission channel 104 to receiver 105. The receiver 105 performs a combination of the information of the first and the second transmissions of the data block and performs demodulation and decoding of the data again. Then, the data block error checking module 106 performs error checks in the decoded data block again and the procedure is repeated until the block is correctly received or the maximum number of retransmissions of the data block is reached.

Figure 4:
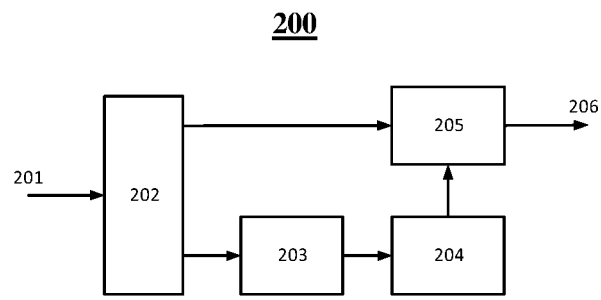
FIG. 4: depicts a functional diagram of transmitter 200, in accordance with various embodiments of the present disclosure.

A functional diagram of the transmitter unit 200 configuration is provided by FIG. 4, in accordance with the embodiments of the present disclosure. As shown, the transmitter unit configuration 200 comprises a data separation module 202 that separates the transmitted data block 201 into encoded and uncoded portions, an encoder 203 configured to encode the encoded portion of data block bits, a modulator 204 configured to modulate encoded bits 204 to intermediate Gray coded signal samples, and a modulator 205 configured to convert the intermediate Gray coded signal samples of the encoded bits into a resulting transmitted modulated signal by adding an offset signal of the uncoded portion of data bits 206.

Figure 5:
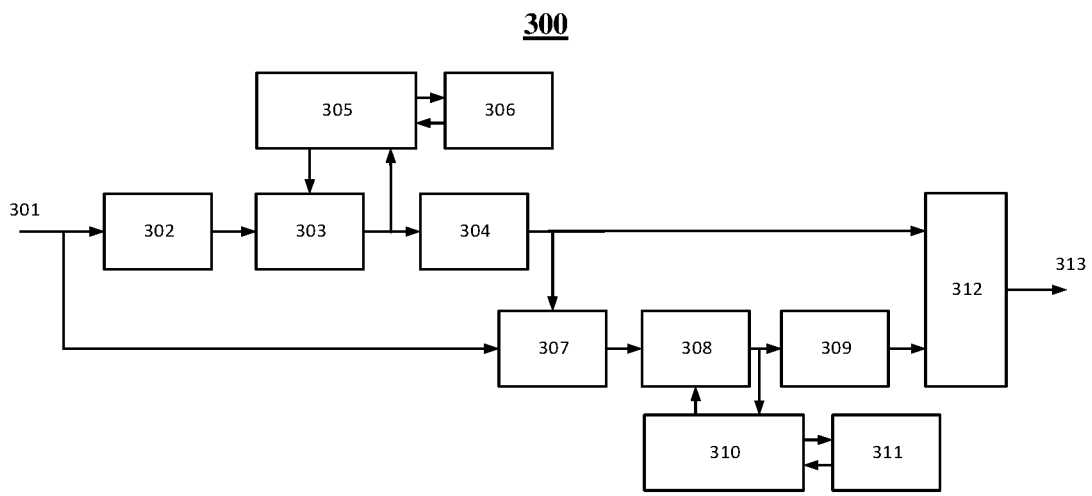
FIG. 5: depicts a functional diagram of receiver 300, in accordance with various embodiments of the present disclosure.

A functional diagram of the receiver unit 300 configuration is provided by FIG. 5, in accordance with the embodiments of the present disclosure. As shown, the receiver unit configuration 300 accepts a received signal 301 that has been transmitted through a communication channel The received signal 301 is processed by demodulator 302 configured to calculate likelihood ratio (LLR) metrics of the transmitted encoded bits. The LLR metric values of transmitted encoded bits for multiple transmissions are then combined by a first aggregating unit 303 and supplied to a first read/write controller 305 for storage into a first memory 306 associated with LLR metric values of the encoded portion of transmitted data bits.

The combined LLR metric values for encoded bits provided by first aggregating unit 303 are also supplied to decoder 304 configured to decode a sequence of LLR metric values of encoded bits, in which the decoded values of encoded bits are forwarded to demodulator 307 configured to demodulate uncoded bits and calculate the LLR metric values of uncoded bits. The LLR metric values of the uncoded bits for multiple transmissions are then combined by a second aggregating unit 308 and supplied to a second read/write controller 310 for storage into memory 311, associated with LLR metric values of uncoded portion of transmitted data bits.

The combined LLR metric values for uncoded bits provided by second aggregating unit 308 are also supplied to threshold device 309 configured to perform decisions on values of uncoded bits based on the values of the combined LLR metrics and data combining module 312 configured to restore the resulting bit sequence into data block 313 according to the separation of bits performed by transmitter unit configuration 200.

In this embodiment, the combined LLR metric values of encoded bits from multiple transmissions provided by first aggregating unit 303 and the combined LLR values metric values of uncoded bits from multiple transmissions provided by second aggregating unit 308 are performed during the second and subsequent transmissions of a data block. For the first transmission, the corresponding LLR metric values that are calculated by the respective demodulators are passed to decoder 304 and threshold device 309 and subsequently written into the memory without changes.

In a representative embodiment, a block code is used to encode bits and the bits of a data block to be encoded are divided into equal groups encoded and decoded by decoder 304 independently.

In another representative embodiment, a Low-Density Parity Check (LDPC) code applied in many communication systems may also be used to encode bits that makes the claimed method applicable to modern multi-Gigabit data transmission networks.

In the embodiments presented above, data processing by receiving units do not require additional computational operations with signal samples. The information combining for uncoded bits of the first and the second transmissions of a data block is performed by operations of calculation and addition of LLR metrics for uncoded bits which have complexity not exceeding the complexity of a standard demodulator for encoded bits. In addition, in specific embodiments, the same receiver computational resources may be used for the calculation of LLR metrics for the encoded and uncoded bits. At the same time, gains in error correction due to H-ARQ usage and gains in the decoder computational resources due to transmission of uncoded bits are fully realized in the described method.

Therefore, the described method provides a reduction of receiver computational complexity for joint implementation of H-ARQ and MLC with an uncoded subset of information bits while keeping all advantages of the said schemes.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of Hybrid Automatic Repeat Request implementation for data transmission with Multi-Level Coding in which Forward Error Correction (FEC) encoded and uncoded subsets of bits are selected in accordance with different levels of noise immunity in a multi-level Quadrature Amplitude Modulation (QAM) symbol, such that the encoded bits are mapped onto less noise immune bits of a QAM symbol and the uncoded bits are mapped onto more noise immune bits of the QAM symbol, the method comprising:
- a. performing a first transmission of a data block containing N signal samples with a portion of bits of the data block encoded with a FEC code due to having lower noise immunity and another portion of bits of the data block remaining uncoded due to having higher noise immunity;
- b. receiving the first transmission of the data block and performing demodulation, FEC decoding of the encoded bit portion, and performing hard decisions on the uncoded bit portion of the received data block;
- c. checking the received data block for errors and sending a retransmission request to the transmitter if errors are detected;
- d. performing a second transmission of the same data block upon receipt of a retransmission request; and
- e. receiving the second transmission of the data block and performing demodulation, FEC decoding of the encoded bit portion, and performing hard decisions on the uncoded bit portion of the received data block accompanied by combining the information obtained after reception of the first and the second transmissions of the data block;

wherein receiving the first transmission of a data block comprises:
- b.1. a first demodulation of signal samples of the first transmission and calculation of likelihood ratio metrics for the encoded bits;
- b.2. FEC decoding of the encoded bits using the calculated likelihood ratio metrics;
- b.3. a second demodulation of signal samples of the first transmission and calculation of likelihood ratio metrics for the uncoded bits using the results of the FEC decoding of the encoded bits as a priori information; and
- b.4. performing the hard decisions on the transmitted uncoded bits using the calculated likelihood ratio metrics for the uncoded bits;

wherein combining the information obtained after reception of the first and the second transmissions of the data block comprises:
- d.1. a first demodulation of signal samples of the second transmission and calculation of likelihood ratio metrics for the encoded bits;
- d.2. combining the likelihood ratio metrics calculated for the encoded bits of the first and the second transmissions of the data block;
- d.3. FEC decoding of the encoded bits using the combined likelihood ratio metrics for the encoded bits;
- d.4. the second demodulation of signal samples of the second transmission and calculation of likelihood ratio metrics for the uncoded bits using the results of the FEC decoding of the encoded bits as a priori information;
- d.5. combining the likelihood ratio metrics calculated for the uncoded bits of the first and the second transmissions of the data block; and
- d.6. performing the hard decisions on the transmitted uncoded bits using the combined likelihood ratio metrics for the uncoded bits.

2. The method of claim 1, wherein the first and the second transmissions of a data block are two consecutive transmissions in a sequence of two or more transmissions of the same data block.

3. The method of claim 1, wherein likelihood ratio metrics for encoded and uncoded bits are calculated in the logarithmic scale.

4. The method of claim 3, wherein a piecewise linear approximation is used to calculate likelihood ratio metrics in the logarithmic scale as a function of a received signal sample.

5. The method of claim 3, wherein a combination of likelihood ratio metrics in the logarithmic scale consists in their algebraic addition.

6. The method of claim 3, wherein the performing hard decisions on the transmitted uncoded bits consists of determining a sign of a likelihood ratio metric in the logarithmic scale.

7. The method of claim 1, wherein encoded and uncoded bits are modulated using the Ungerboeck modulation.

8. The method of claim 1, wherein a block code is used to encode bits and encoded bits of a data block are divided into equal groups which are encoded and decoded independently.

9. The method of claim 1, wherein a Low-Density Parity Check code is used to encode bits.

* * * * *